(12) United States Patent
Lin

(10) Patent No.: US 12,154,460 B2
(45) Date of Patent: Nov. 26, 2024

(54) METHOD OF FORMING AN OBJECT FORMING STRUCTURE

(71) Applicant: Chih-Chieh Lin, Taipei (TW)

(72) Inventor: Chih-Chieh Lin, Taipei (TW)

( * ) Notice: Subject to any disclaimer, the term of this patent is extended or adjusted under 35 U.S.C. 154(b) by 725 days.

(21) Appl. No.: 17/220,232

(22) Filed: Apr. 1, 2021

(65) Prior Publication Data

US 2022/0157209 A1 May 19, 2022

(30) Foreign Application Priority Data

Nov. 18, 2020 (TW) ................. 109215214

(51) Int. Cl.
| | |
|---|---|
| *G09F 19/14* | (2006.01) |
| *B44F 7/00* | (2006.01) |
| *G06T 15/00* | (2011.01) |
| *G06T 15/20* | (2011.01) |
| *G06T 17/00* | (2006.01) |
| *G06T 17/10* | (2006.01) |
| *G06T 19/00* | (2011.01) |

(52) U.S. Cl.
CPC ................ *G09F 19/14* (2013.01); *B44F 7/00* (2013.01); *G06T 15/205* (2013.01); *G06T 17/00* (2013.01); *G06T 17/10* (2013.01); *G06T 15/00* (2013.01); *G06T 19/00* (2013.01)

(58) Field of Classification Search
None
See application file for complete search history.

(56) References Cited

U.S. PATENT DOCUMENTS

2011/0292031 A1* 12/2011 Zhu .................. G06F 21/36
345/419

OTHER PUBLICATIONS

3D Maker Noob, https://www.youtube.com/watch?v=sSK2Dh17ZCY, Nov. 17, 2019.*

* cited by examiner

*Primary Examiner* — Jeffrey J Chow
(74) *Attorney, Agent, or Firm* — GUICE PATENTS PLLC

(57) ABSTRACT

An object forming structure includes: at least two first original images, respectively provided with different vectors, and extended for forming at least two first original image three-dimensional shapes; at least one intersect fixed point, extended with at least one intersect direction through the intersect fixed point, wherein at least two second image three-dimensional shapes are formed through the first original image three-dimensional shapes being extended; and at least two third image three-dimensional shapes, stacked with the at least two second image three-dimensional shapes, wherein a Boolean function is utilized for confirming a selected desired zone for forming a new object formation; wherein, the new object formation formed via the third image three-dimensional shapes is obtained through a combination of intersect or union or equalize the different vectors, the first original image three-dimensional shapes are presented via the corresponding vectors for presenting different shapes in other angles.

5 Claims, 7 Drawing Sheets

METHOD OF FORMING AN OBJECT FORMING STRUCTURE

BACKGROUND OF THE INVENTION

1. Field of the Invention

The present invention relates to a structure, especially to an object forming structure.

2. Description of Related Art

A conventional three-dimensional object can only be formed through a planar structure being extended, and the shape thereof can only be in a single status without any alternations, so that the conventional three-dimensional object in unable to draw consumer's attentions and the commercial value cannot be increased; moreover, the conventional three-dimensional shape is unable to generate an innovative change due to the structural limitations, thus the practicability is very much limited; as such, the abovementioned shortages shall be improved by the skilled people in the art.

SUMMARY OF THE INVENTION

For solving the shortages existed in the prior art, one primary objective of the present invention is to provide an object forming structure, in which a first original image is provided with vectors and a first original image three-dimensional shape is formed through being extended, a second image three-dimensional shape is set with an intersect fixed point and extended with an intersect direction, so that a new object formation of a third image three-dimensional shape can be formed through stacking selected desired zones, thereby solving the shortages existed in the prior art.

Another objective of the present invention is to provide an object forming structure, in which by utilizing a means of intersect or union or equalize different vector to be combined with a new object formation, a first original image three-dimensional shape can be presented via corresponding vectors for presenting different shapes in other angles.

One another objective of the present invention is to provide an object forming structure, which has advantages of effectively increasing functions of providing a three-dimensional effect and providing with more fun and varieties to an object formation.

The problem to be solved by the present invention is that: a conventional three-dimensional object can only be formed through a planar structure being extended, and the shape thereof can only be in a single status without any alternations, so that the conventional three-dimensional object in unable to draw consumer's attentions; moreover, the conventional three-dimensional shape is unable to generate an innovative change, thus the practicability is very much limited.

For achieving the aforesaid objectives, one technical solution provided by the present invention is to provide an object forming structure, characterized in including:

at least two first original images, respectively provided with different vectors, and extended for forming at least two first original image three-dimensional shapes;

at least one intersect fixed point, defined at the first original image three-dimensional shape, and respectively extended with at least one intersect direction through the intersect fixed point, wherein at least two second image three-dimensional shapes are formed through the first original image three-dimensional shapes being extended from the intersect fixed point along the intersect direction; and at least two third image three-dimensional shapes, stacked with the at least two second image three-dimensional shapes having the intersect fixed point and the intersect direction, wherein a Boolean function is utilized for confirming a selected desired zone for forming a new object formation;

wherein, the new object formation formed via the third image three-dimensional shapes is obtained through a combination of intersect or union or equalize the different vectors, the first original image three-dimensional shapes are presented via the corresponding vectors for presenting different shapes in other angles.

Wherein, according to the present invention, the first original images are the same images or different images.

Wherein, according to the present invention, the shape of the first original images is selected from a group consisted of a planar original image and an embossed image or a combination thereof.

Wherein, according to the present invention, the third image three-dimensional shapes are selected from a group consisted of an overlapped zone, a non-overlapped zone and a hollow zone or a combination thereof.

Wherein, according to the present invention, the selected desired zone confirmed via the Boolean function is selected from a group consisted of intersect and union and equalize or a combination thereof.

Advantages achieved by the present invention are as follows: the first original images is provided with the vectors and the first original image three-dimensional shape is formed through being extended, the second image three-dimensional shape is set with the intersect fixed point and extended with the intersect direction, the new object formation of the third image three-dimensional shape can be formed through stacking the second image three-dimensional shape and the selected desired zone; as such, by utilizing a means of intersect or union or equalize the different vectors to be combined with the new object formation, the first original image three-dimensional shape can be presented via the corresponding vectors for presenting different shapes in other angles; thus functions of providing a three-dimensional effect and providing with more fun and varieties to the object formation can be effectively increased; accordingly, the present invention is novel and more practical in use, and can satisfy requirements of the consumers.

DETAILED DESCRIPTION OF THE PREFERRED EMBODIMENT

One preferred embodiment of the present invention will be described with reference to the drawings for illustrating the structural assembly, the technical means and the functions to be achieved by the present invention; and the actual ratios and the arrangement of components shall not be limited by the ratios and the arrangement of components in the provided figures.

Figure 1:
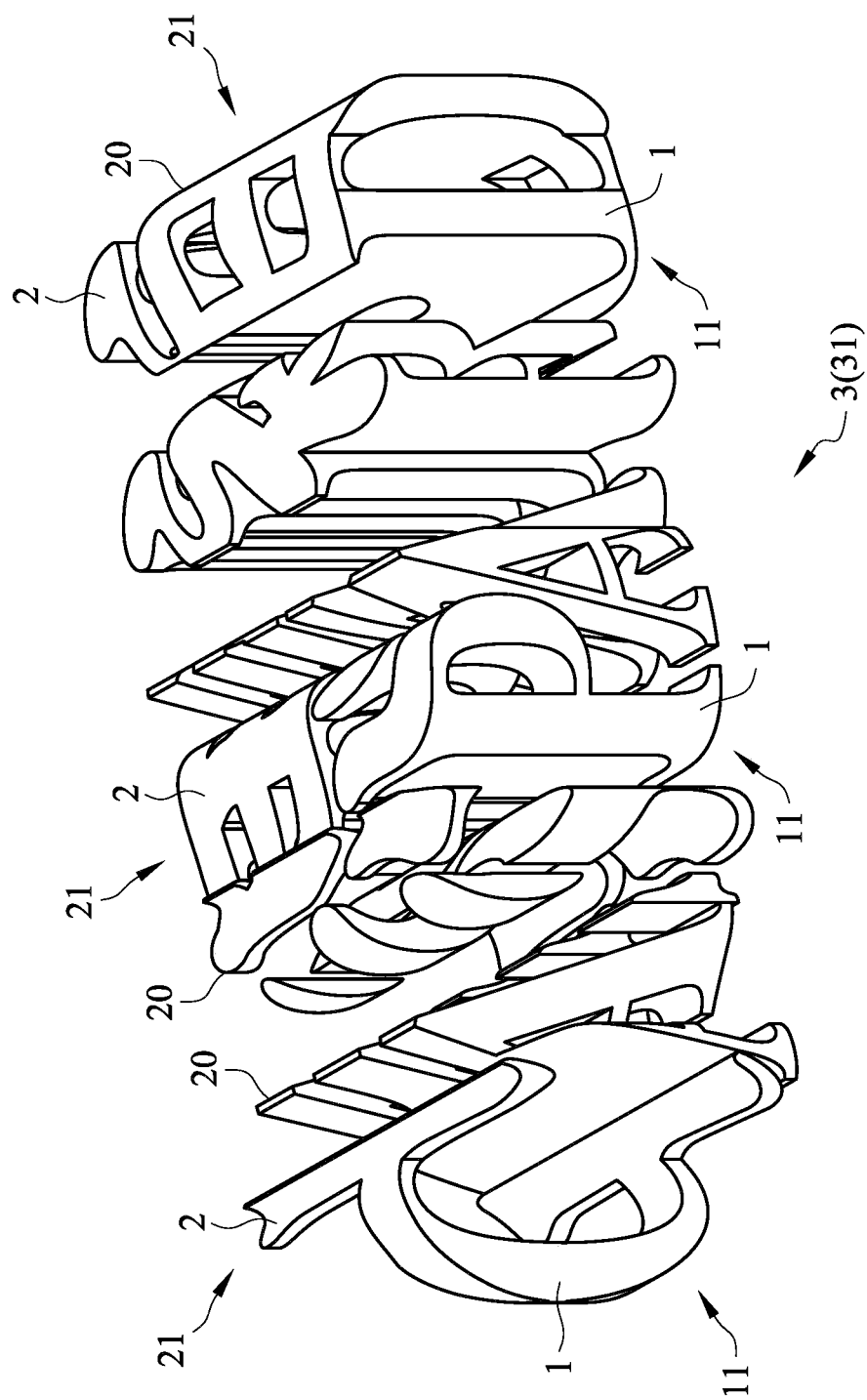
FIG. 1 is a perspective exploded view according to the present invention.
Figure 2:
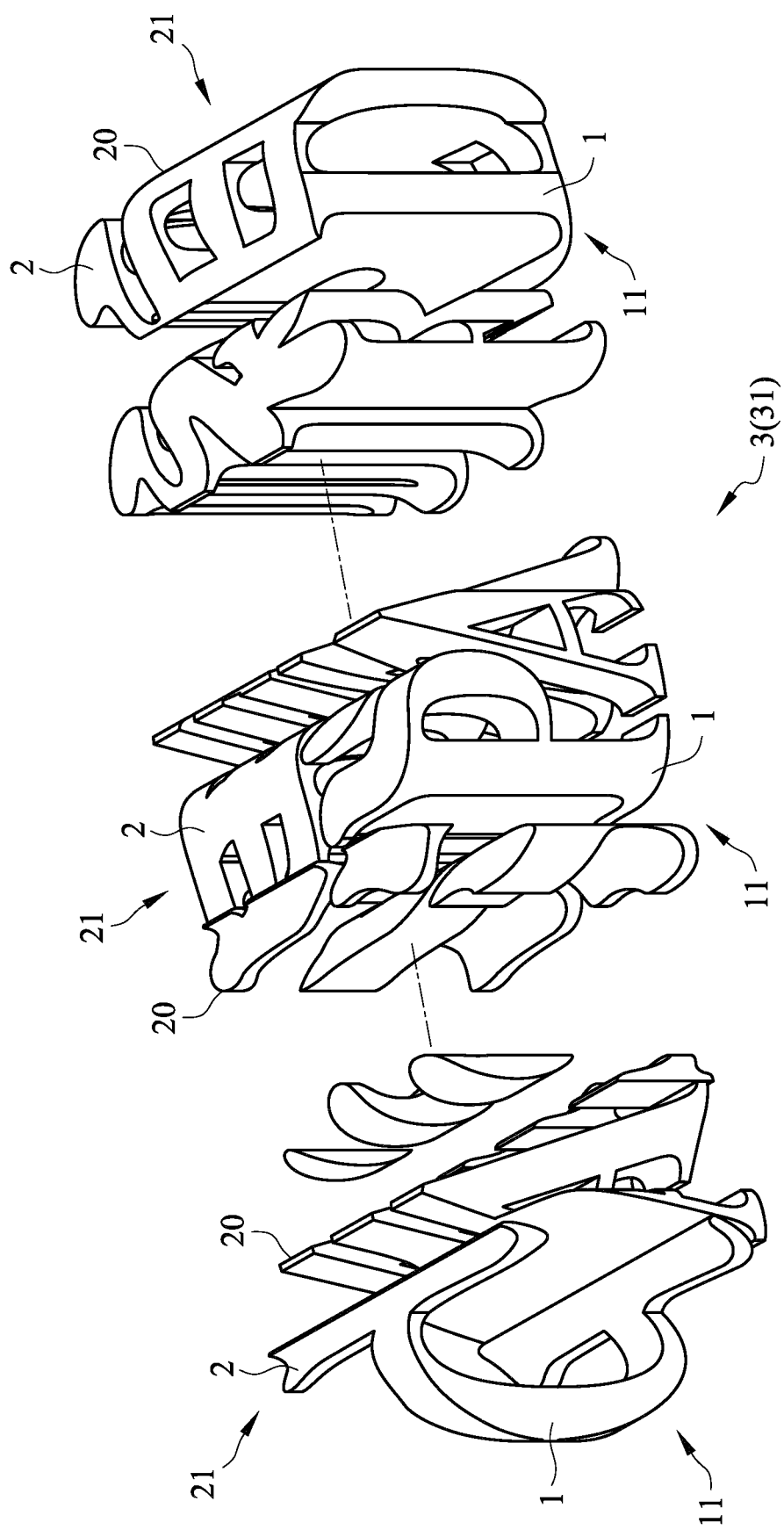
FIG. 2 is a perspective view showing the assembly according to the present invention.
Figure 3:
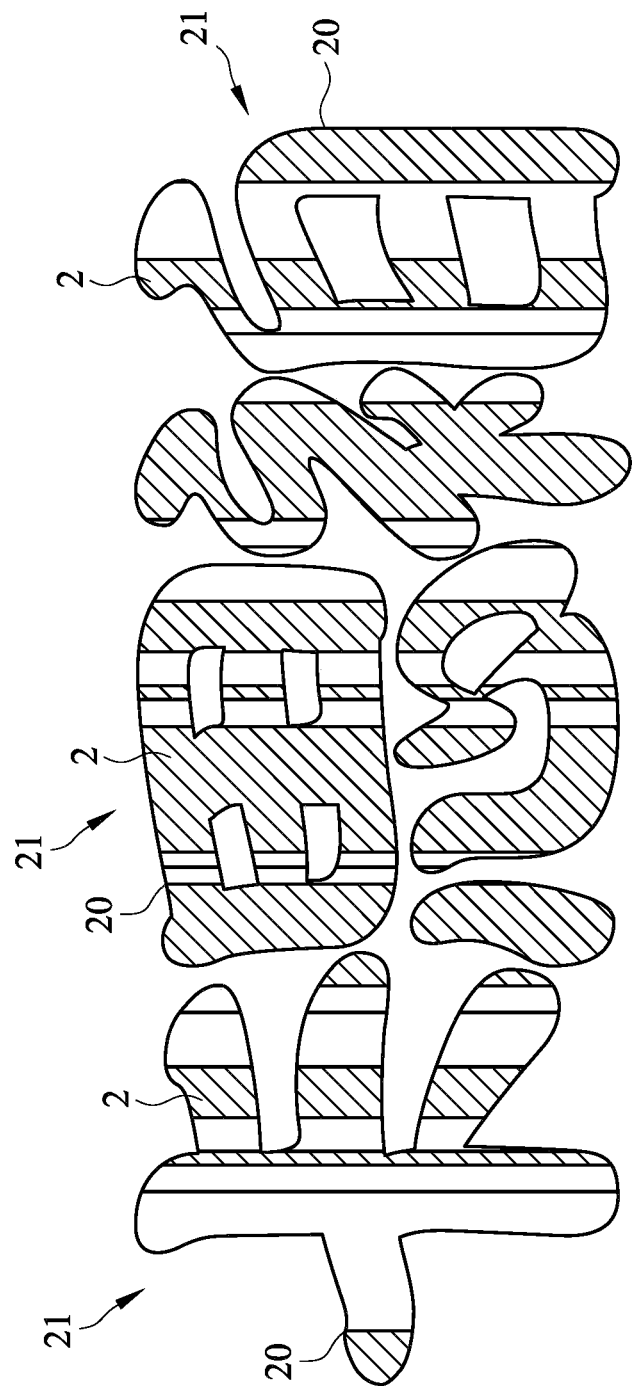
FIG. 3 is a cross sectional view showing the assembly according to the present invention.
Figure 4:
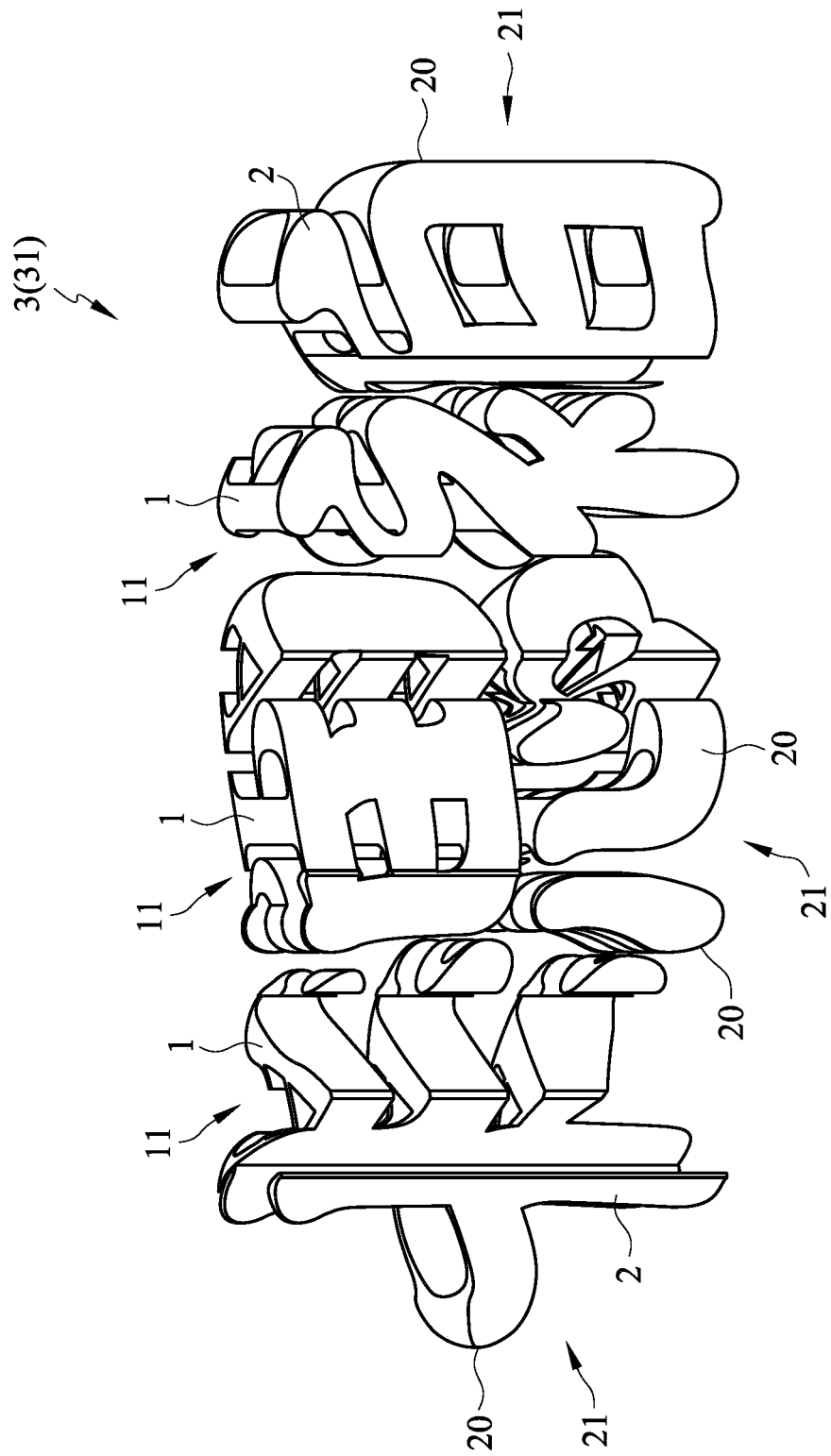
FIG. 4 is a perspective view showing a status of being combined with the embodiment disclosed in FIG. 2 according to the present invention.
Figure 5:
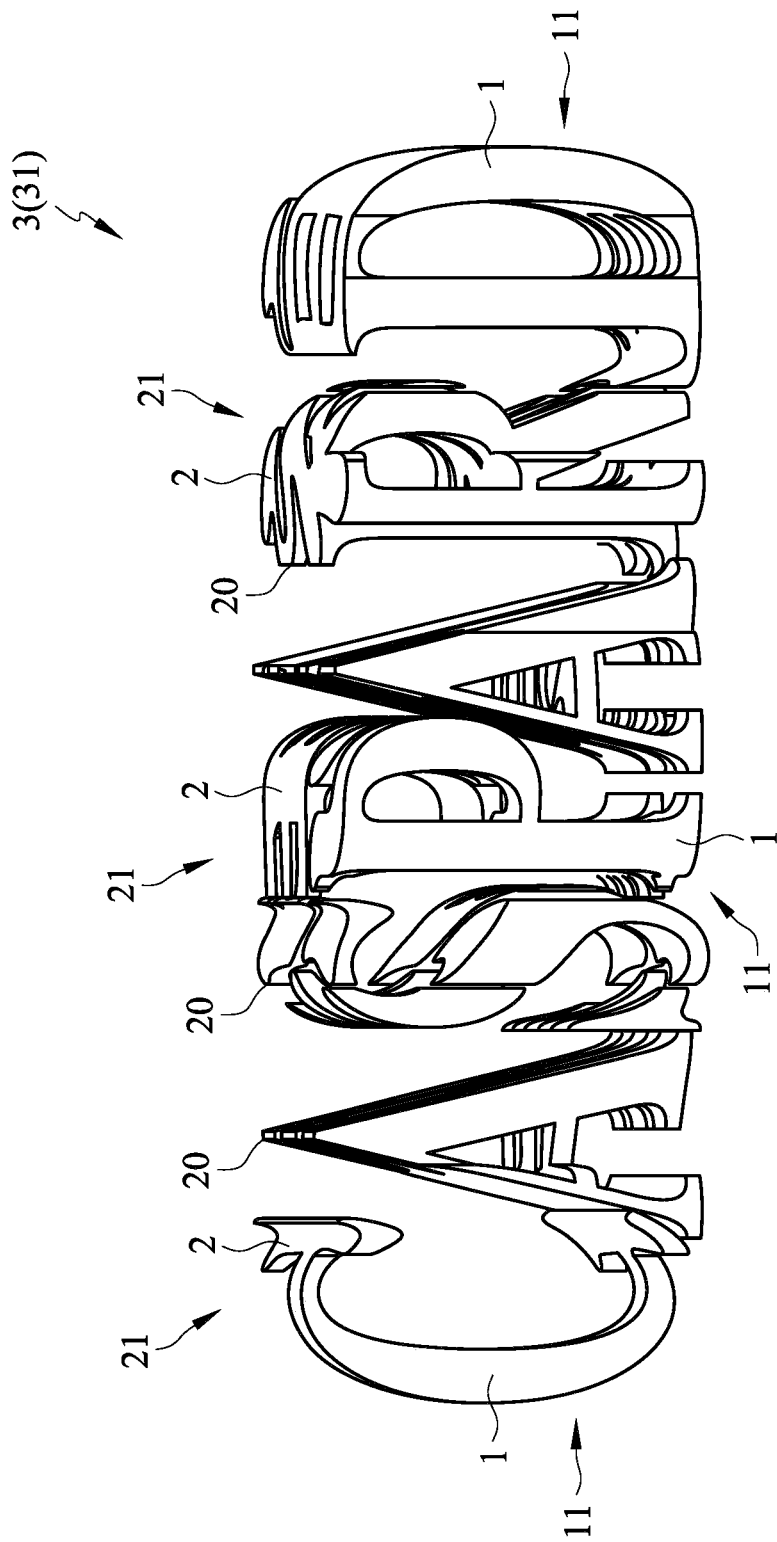
FIG. 5 is a perspective view according to another embodiment the present invention.
Figure 6:
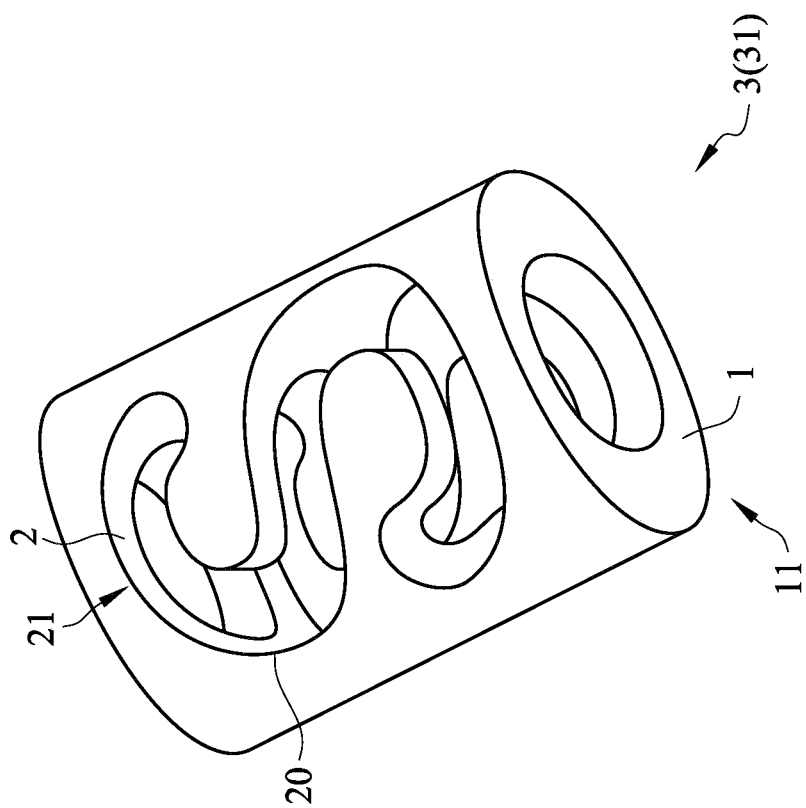
FIG. 6 is a perspective view according to one another embodiment the present invention.

Please refer from FIG. 1 to FIG. 6, wherein FIG. 1 is a perspective exploded view according to the present invention; FIG. 2 is a perspective view showing the assembly according to the present invention; FIG. 3 is a cross sectional view showing the assembly according to the present invention; FIG. 4 is a perspective view showing a status of being combined with the embodiment disclosed in FIG. 2 according to the present invention; FIG. 5 is a perspective view according to another embodiment the present invention; and FIG. 6 is a perspective view according to one another embodiment the present invention According to one preferred embodiment of the present invention, an object forming structure is provided, and characterized in including at least two first original images 1, at least one intersect fixed point 2 and at least two third image three-dimensional shapes 3.

The at least two first original images 1 are respectively provided with different vectors, and extended for forming at least two first original image three-dimensional shapes 11; the first original images 1 can be the same images or different images; the shape of the first original images 1 is selected from a group consisted of a planar original image and an embossed image or a combination thereof (as shown from FIG. 1 to FIG. 6).

The at least one intersect fixed point 2 is defined at the first original image three-dimensional shape 11, and respectively extended with at least one intersect direction 20 through the intersect fixed point 2, and at least two second image three-dimensional shapes 21 are formed through the first original image three-dimensional shapes 11 being extended from the intersect fixed point 2 along the intersect direction 20 (as shown from FIG. 1 to FIG. 6).

The at least two third image three-dimensional shapes 3 are stacked with the at least two second image three-dimensional shapes 21 having the intersect fixed point 2 and the intersect direction 21, and a Boolean function is utilized for confirming a selected desired zone for forming a new object formation 31, the new object formation 31 formed via the third image three-dimensional shapes 3 is obtained through utilizing a means of intersect or union or equalize the different vectors, the first original image three-dimensional shapes 11 are presented via the corresponding vectors for presenting different shapes in other angles; the third image three-dimensional shapes 3 are selected from a group consisted of an overlapped zone, a non-overlapped zone and a hollow zone or a combination thereof; the selected desired zone confirmed via the Boolean function is selected from a group consisted of intersect and union and equalize or a combination thereof (as shown from FIG. 1 to FIG. 6).

Figure 7:
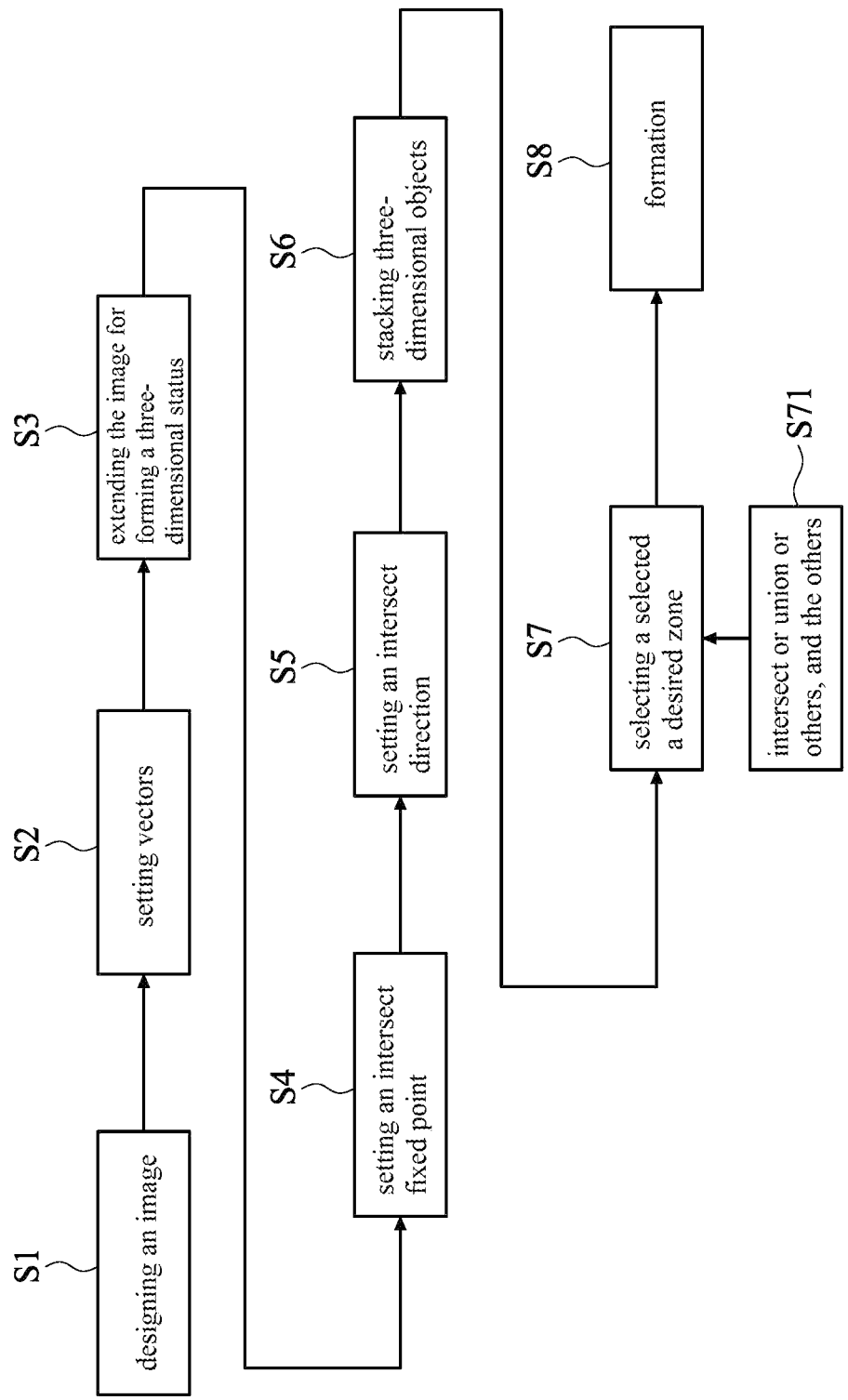
FIG. 7 is a flowchart showing a process of object forming structure according to the present invention.

Please refer from FIG. 4 to FIG. 6, wherein FIG. 4 is a perspective view according to the present invention; FIG. 5 is a perspective view showing a multi-layered extending status according to another embodiment the present invention; and FIG. 6 is a perspective view of FIG. 4 according to one another embodiment the present invention Please refer to FIG. 7, which is a flowchart showing a process of object forming structure according to the present invention. The present invention provides a process of object forming structure, which includes: (step 1) designing an image S1; (step 2) setting vectors S2; (step 3) extending the image for forming a three-dimensional status S3; (step 4) setting an intersect fixed point S4; (step 5) setting an intersect direction S5; (step 6) stacking three-dimensional objects S6, wherein a Boolean function being utilized for confirming; (step 7) selecting a selected a desired zone S7, wherein the S7 of selecting the selected desired zone can be provided with a S71 of intersect or union or others, and the others including but not limiting to equalize; and (step 8) formation S8.

Accordingly, the first original images 1 is provided with the vectors and the first original image three-dimensional shape 11 is formed through being extended, the second image three-dimensional shape 21 is set with the intersect fixed point 2 and extended with the intersect direction 20, the new object formation 31 of the third image three-dimensional shape 31 can be formed through stacking the second image three-dimensional shape 21 and the selected desired zone; as such, by utilizing a means of intersect or union or equalize the different vectors to be combined with the new object formation 31, the first original image three-dimensional shape 11 can be presented via the corresponding vectors for presenting different shapes in other angles; thus functions of providing a three-dimensional effect and providing with more fun and varieties to the object formation 31 can be effectively increased; accordingly, the present invention is novel and more practical in use, and can satisfy requirements of the consumers.

What is claimed is:

1. A method for forming an object forming structure, characterized in including:

designing at least two first original images, respectively provided with different vectors, and extended for forming at least two first original image three-dimensional shapes;

setting at least one intersect fixed point, defined at the first original image three-dimensional shape, and respectively extended with at least one intersect direction through the intersect fixed point, wherein at least two second image three-dimensional shapes are formed through the first original image three-dimensional shapes being extended from the intersect fixed point along the intersect direction; and forming at least two third image three-dimensional shapes, stacked with the at least two second image three-dimensional shapes having the intersect fixed point and the intersect direction, wherein a Boolean function is utilized for confirming a selected desired zone for forming a new object formation;

wherein, the new object formation formed via the third image three-dimensional shapes is obtained through a combination of intersect or union or equalize the different vectors, the first original image three-dimensional shapes are presented via the corresponding vectors for presenting different shapes in other angles.

2. The method as claimed in claim 1, wherein the first original images are the same images or different images.

3. The method as claimed in claim 1, wherein a shape of the first original images is selected from a group consisted of a planar original image and an embossed image or a combination thereof.

4. The method as claimed in claim 1, wherein the third image three-dimensional shapes are selected from a group consisted of an overlapped zone, a non-overlapped zone and a hollow zone or a combination thereof.

5. The method as claimed in claim 1, wherein the selected desired zone confirmed via the Boolean function is selected from a group consisted of intersect and union and equalize or a combination thereof.

\* \* \* \* \*